United States Patent

Lu et al.

(10) Patent No.: US 8,909,281 B2
(45) Date of Patent: Dec. 9, 2014

(54) METHOD AND SYSTEM FOR CONTROLLING AN UPLINK TRANSMITTING POWER, AND A BASE STATION

(75) Inventors: Zhaohua Lu, Shenzhen (CN); Peng Hao, Shenzhen (CN); Yan Xue, Shenzhen (CN); Ying Liu, Shenzhen (CN); Kun Liu, Shenzhen (CN)

(73) Assignee: ZTE Corporation, Shenzhen (CN)

( * ) Notice: Subject to any disclaimer, the term of this patent is extended or adjusted under 35 U.S.C. 154(b) by 698 days.

(21) Appl. No.: 13/126,383

(22) PCT Filed: Mar. 13, 2009

(86) PCT No.: PCT/CN2009/070777
§ 371 (c)(1),
(2), (4) Date: Sep. 19, 2011

(87) PCT Pub. No.: WO2010/048798
PCT Pub. Date: May 6, 2010

(65) Prior Publication Data
US 2012/0004006 A1  Jan. 5, 2012

(30) Foreign Application Priority Data

Oct. 31, 2008 (CN) .......................... 2008 1 0172303

(51) Int. Cl.
*H04B 7/00* (2006.01)
*H04W 52/42* (2009.01)
(Continued)

(52) U.S. Cl.
CPC ............. *H04W 52/42* (2013.01); *H04L 5/0007* (2013.01); *H04L 5/0053* (2013.01);
(Continued)

(58) Field of Classification Search
CPC ..... H04W 52/04; H04W 52/18; H04W 52/24; H04W 52/241
USPC ................................... 455/522, 69
See application file for complete search history.

(56) References Cited

U.S. PATENT DOCUMENTS 7,162,250 B2 * 1/2007 Misra .......................... 455/453
(Continued)

FOREIGN PATENT DOCUMENTS

CN            1917393 A       2/2007
(Continued)

OTHER PUBLICATIONS

International Search Report (PCT/ISA/210) issued in PCT Application No. PCT/CN2009/070777, mailed Jul. 9, 2009.

*Primary Examiner* — Lewis West
(74) *Attorney, Agent, or Firm* — Venable LLP; Robert Kinberg; Todd R. Farnsworth

(57) ABSTRACT

The present invention discloses a method and a system for controlling an uplink transmitting power, and a base station, wherein the method comprises: determining respective power control parameters of each frequency partition in a system whose uplink frequency band is divided into a plurality of frequency partitions, wherein each frequency partition comprises a plurality of physical sub-carriers; and a base station transmitting the power control parameters of all or part of the frequency partitions to a terminal, so that the terminal determines a transmitting power on a sub-carrier included in a corresponding frequency partition according to the power control parameters. By using the present invention, the power control parameters of a plurality of frequency partitions of an uplink frequency band are transmitted to the terminal, so that the terminal determines the transmitting power on the sub-carrier included in the corresponding frequency partition according to the power control parameters, which can solve the problems that the methods for controlling the uplink transmitting power in related technology is not flexible and can not effectively improve the uplink performance of the system, and can achieve the aims of controlling the uplink interference between the cells effectively and improving the uplink performance of the system.

11 Claims, 3 Drawing Sheets

(51) Int. Cl.
*H04L 5/00* (2006.01)
*H04W 52/24* (2009.01)
*H04W 52/14* (2009.01)
*H04W 52/54* (2009.01)
*H04W 72/04* (2009.01)
*H04W 72/08* (2009.01)

(52) U.S. Cl.
CPC .......... *H04W 52/243* (2013.01); *H04W 52/146* (2013.01); *H04W 52/54* (2013.01); *H04W 72/0473* (2013.01); *H04W 72/082* (2013.01); *H04W 72/085* (2013.01)
USPC ............................................. 455/522; 455/69

(56) References Cited

U.S. PATENT DOCUMENTS

| | | | |
|---|---|---|---|
| 7,826,435 B1 * | 11/2010 | Wu et al. | 370/342 |
| 7,965,789 B2 * | 6/2011 | Khandekar et al. | 375/297 |
| 2006/0292989 A1 * | 12/2006 | Gerlach et al. | 455/63.1 |
| 2007/0041429 A1 * | 2/2007 | Khandekar | 375/146 |
| 2009/0270109 A1 * | 10/2009 | Wang Helmersson et al. | 455/453 |
| 2010/0075689 A1 * | 3/2010 | Uemura et al. | 455/452.1 |

FOREIGN PATENT DOCUMENTS

| | | |
|---|---|---|
| CN | 101237260 A | 8/2008 |
| CN | 101272172 A | 9/2008 |
| WO | WO-0239617 A1 | 5/2002 |

\* cited by examiner

METHOD AND SYSTEM FOR CONTROLLING AN UPLINK TRANSMITTING POWER, AND A BASE STATION

CROSS-REFERENCE TO THE RELATED APPLICATION

This application is a National Stage Application of International Application No. PCT/CN2009/070777, filed Mar. 13, 2009, which designates the United States and claims priority to Chinese Application No. 200810172306.8, filed Mar. 31, 2008, the contents of each of which are incorporated by reference in their entirety.

FIELD OF THE INVENTION

The present invention relates to the communication field, in particular to a method and a system for controlling an uplink transmitting power, and a base station.

BACKGROUND OF THE INVENTION

In a wireless communication system, a base station refers to a device which provides services for a terminal. The base station communicates with the terminal through an uplink/a downlink, wherein the downlink (forward direction) refers to the direction from the base station to the terminal, and the uplink (backward direction) refers to the direction from the terminal to the base station. A plurality of terminals can transmit data to the base station through the uplink at the same time, and can also receive data from the base station through the downlink at the same time.

In order to further improve the utilization efficiency of the frequency spectrum of the wireless communication system, each cell is required to use the whole frequency resources as much as possible, i.e., the frequency multiplexing factor is 1. However, due to the mutual interference between the users using the same frequency resources in each cell, the uplink interference between the cells has a strong impact on the uplink performance of the wireless communication system. Obviously, to reduce the influence of the uplink interference between the cells to the performance of the system is an important aim of the cellular system design.

A reasonable power control scheme can effectively control the uplink interference between the cells. For example, in the Long Term Evolution (LTE) standard established by the 3rd Generation Partnership Project (3GPP) standardization organization, a partial link loss compensation factor is introduced into the whole system frequency band to control the power. By the design, the Interference over Thermal Noise Ratio (IoT, thus the interference can also be understood as rise noises) of the uplink of the system is controlled to a relatively stable value, so as to improve the uplink performance of the wireless communication system. While in the Ultra Mobile Broadband (UMB) standard established by the 3GPP2 standardization organization, the terminal determines the available uplink transmitting power to control the uplink interference between the cells according to the uplink interference condition on the whole system frequency band of the received adjacent cell broadcast.

It can be seen from the above-mentioned description, in the two schemes of the 3GPP and the 3GPP2, the whole uplink frequency resources only have one description variable, i.e., the description variable in the 3GPP scheme is the partial link loss compensation factor, and the description variable in the 3GPP2 scheme is the uplink interference condition on the whole system frequency band of the adjacent cell broadcast namely IoT. In this way, the uplink transmitting power is determined by one resource description variable of the uplink frequency, which will restrict the flexibility of controlling the uplink interference between the cells, and impact the uplink performance of the wireless communication system.

SUMMARY OF THE INVENTION

The present invention is set forth with consideration of the problems in related technology that the methods for controlling the uplink transmitting power is not flexible, and can not effectively improve the uplink performance of the system. For this reason, the present invention mainly aims to provide an improved scheme for controlling the uplink transmitting power to solve at least one of above-mentioned problems in related technology.

In order to achieve the above-mentioned aim, a method for controlling an uplink transmitting power is provided according to one aspect of the present invention.

The method for controlling the uplink transmitting power according to the present invention comprises: determining respective power control parameters of each frequency partition in a system whose uplink frequency band is divided into a plurality of frequency partitions, wherein each frequency partition comprises a plurality of physical sub-carriers; and a base station transmitting the power control parameters of each of the frequency partitions to a terminal, so that the terminal determines a transmitting power on a sub-carrier included in a corresponding frequency partition according to the power control parameters.

Preferably, the power control parameters comprise a compensation factor.

Preferably, before transmitting the power control parameters to the terminal, the method further comprises: for each frequency partition, determining the compensation factor of corresponding frequency partition of present cell according to an expected uplink Interference over Thermal Noise Ration (IoT) of adjacent cells in the frequency partition.

Preferably, the compensation factor ($\alpha$) can be determined by one of the following formulas: $\alpha=\min(\mathrm{IoT}_n)/\max(\mathrm{IoT}_n)$, wherein, $\alpha$ is a real number more than or equal to 0 and less than or equal to 1, $\mathrm{IoT}_n$ is a set of values of the expected IoT of the adjacent cells in the frequency partition;

$$\alpha = N * \min(IoT_n) \Big/ \sum_{i=1}^{N} IoT_{n_i},$$

wherein, $\alpha$ is a real number more than or equal to 0 and less than or equal to 1, $\mathrm{IoT}_n$ is a set of values of the expected IoT of the i-th adjacent cells in the frequency partition, $\mathrm{IoT}_{n_i}$ is a value of the expected IoT of the i-th adjacent cell in the frequency partition, N is a number of adjacent cells and is a natural number more than or equal to 1;

$$\alpha = \left(\sum_{i=1}^{N} IoT_{n_i}\right) \Big/ (N * \max(IoT_n)),$$

wherein, $\alpha$ is a real number more than or equal to 0 and less than or equal to 1, $\mathrm{IoT}_n$ is a set of values of the expected IoT of the adjacent cells in the frequency partition, $\mathrm{IoT}_{n_i}$ is a value of expected IoT of the i-th adjacent cell in the frequency partition, N is a number of adjacent cells and is a natural number more than or equal to 1; and $$a = \left(N \Big/ \sum_{i=1}^{N} (1/IoT_{n_i})\right) \Big/ \max(IoT_n),$$

wherein, α is a real number more than or equal to 0 and less than or equal to 1, $IoT_n$ is a set of values of the expected IoT of the adjacent cells in the frequency partition, $IoT_{n_i}$ is a value of expected IoT of the i-th adjacent cell in the frequency partition, N is a number of adjacent cells and is a natural number more than or equal to 1.

Preferably, the method further comprises: the terminal determines the transmitting power ($P_{SC}$) on the sub-carrier by one of the following formulas: $P_{SC}=\min\{P_{max}, P_{ref}+\alpha \cdot PL+\Delta_{TF}(i)+f(j)\}$, wherein, $P_{ref}$ is a minimum receiving power required for the base station to guarantee basic quality of a receiving signal, α is the compensation factor, PL, is a link loss compensation value determined by the terminal according to receiving quality of a downlink channel, $\Delta_{TF}(i)$ is an adjustment parameter related to modulation code grade allocated to the terminal by the base station, wherein i is a grade of transmission format, $f(j)$ is a power adjustment command sent to the terminal by the base station, and a value of the $f(j)$ is more than or equal to 0, j is an identifier of the terminal, $P_{max}$ is a maximum transmitting power of the terminal on a sub-carrier included in the frequency partition; $P_{SC}=\min\{P_{max}, SINR_{TARGET}+\alpha \cdot PL+N+IoT\}$, wherein, $SINR_{TARGET}$ is a target ratio of signal to noise required for the base station to receive uplink data normally, α is the compensation factor, PL is a link loss compensation value determined by terminal according to receiving quality of a downlink channel, N is a thermal noise, IoT is a value of an interference over thermal noise ratio of the base station, $P_{max}$ is a maximum transmitting power of the terminal on a sub-carrier included in the frequency partition; $P_{SC}=P_{max}*\min[1,\max[R_{min},(PL/PL_{x-tile})^\alpha]]$, wherein, $R_{min}$ is a minimum transmitting power measurement factor of the terminal, α is the compensation factor, PL is a link loss compensation value determined by the terminal according to receiving quality of a downlink channel, $PL_{x-tile}$ is a statistical value determined according to link loss condition of the terminal, $P_{max}$ is a maximum transmitting power of the terminal on a sub-carrier included in the frequency partition; $P_{SC}=\min\{P_{max}, SINR_{TARGET}+\alpha \cdot PL+N+IoT+\Delta_{power\_adjust}+\sigma_{power\_scaling}+Offset_{ICI}\}$, wherein $SINR_{TARGET}$ is a target ratio of signal to noise required for the base station to receive uplink data normally, α is the compensation factor, PL is a link loss compensation value determined by the terminal according to receiving quality of a downlink channel, N is a thermal noise, IoT is a value of an interference over thermal noise ratio of the base station, $\Delta_{power\_adjust}$ is a power adjustment value sent to the terminal by the base station, $\sigma_{power\_scaling}$ is a power adjustment value in a single user transmitting mode or a multi-user transmitting mode, $Offset_{ICI}$ is an adjustment value for adjusting interference between cells sent by the base station, $P_{max}$ is a maximum transmitting power of the terminal on a sub-carrier included in the frequency partition; and $P_{SC}=\min\{P_{max}, SINR_{TARGET}+\alpha \cdot PL+N+IoT+\Delta_{BS}+\Delta_{MS}\}$, wherein, $SINR_{TARGET}$ a target ratio of signal to noise required for the base station to receive uplink data normally, α is the compensation factor, PL is a link loss compensation value determined by the terminal according to receiving quality of a downlink channel, N is a thermal noise, IoT is a value of an interference over thermal noise ratio of the base station, $\Delta_{BS}$ is a power adjustment value sent to the terminal by the base station, $\Delta_{MS}$ is a self-adjustment value of the terminal determined according to condition of a wireless channel, $P_{max}$ is a maximum transmitting power of the terminal on a sub-carrier included in the frequency partition.

Preferably, under the circumstance that a plurality of frequency partitions have same compensation factors, transmitting the power control parameters to the terminal comprises: transmitting one of the same compensation factors and identifying the plurality of frequency partitions having the same compensation factors by a frequency partition identifier or a mode of bit mapping.

Preferably, the method further comprises: the terminal receives and analyzes the compensation factor, and determines the transmitting power on the sub-carrier included in the corresponding frequency partition according to the compensation factor, wherein if the terminal fails to receive or analyze the compensation factor, the default value of the compensation factor is 1.

Preferably, the power control parameters comprise: noise rise target.

Preferably, before transmitting the power control parameters to the terminal, the method further comprises: for each frequency partition, determining the noise rise target of corresponding frequency partition of present cell according to an expected IoT of adjacent cells in the frequency partition.

Preferably, the noise rising target (NRT) can be determined by one of the following formulas: $NRT=\min(IoT_n)$, wherein, $IoT_n$ is a set of values of the expected IoT of the adjacent cells in the frequency partition;

$$NRT = \left(\sum_{i=1}^{N} IoT_{n_i}\right) \Big/ N,$$

wherein, $IoT_n$ is a set of values of the expected IoT of the adjacent cells in the frequency partition, N is a number of adjacent cells and is a natural number more than or equal to 1; and $$NRT = N \Big/ \sum_{i=1}^{N} (1/IoT_{n_i}),$$

wherein, $IoT_{n_i}$ is a value of expected IoT of the i-th adjacent cell in the frequency partition, N is a number of adjacent cells and is a natural number more than or equal to 1.

Preferably, the method further comprises: the terminal determines the transmitting power ($P_{SC}$) on the sub-carrier by the following formula: $P_{SC}=\min\{P_{max}, NRT+N-g\}$, wherein, NRT is a value of the noise rise target, N is a thermal noise, g is an equivalent path gain, and is a difference value between a total receiving power of the terminal and a power received from the base station by the terminal, $P_{max}$ is a maximum transmitting power of the terminal on a sub-carrier included in the frequency partition.

Preferably, the base station transmits the power control parameters in the modes of broadcast, multicast or unicast.

In order to achieve the above-mentioned aim, a base station is provided according to another aspect of the present invention.

The base station according to the present invention comprises: a first determining module, adapted to determine power control parameters of each frequency partition; and a transmitting module, adapted to transmit the power control parameters determined by the first determining module to a terminal.

Preferably, the power control parameters comprise one of the following: a compensation factor and a noise rising target.

Preferably, the first determining module is further adapted to determine the power control parameters of each corresponding frequency partition according to an excepted IoT of adjacent cells in each frequency partition.

In order to achieve the above-mentioned aim, a system for controlling an uplink transmitting power is provided according to another aspect of the present invention. The system for controlling the uplink transmitting power comprises a base station and a terminal, wherein the base station comprises: a first determining module, adapted to determine power control parameters of each frequency partition; a transmitting module, adapted to transmit the power control parameters determined by the first determining module to the terminal; the terminal comprises: a receiving module, adapted to receive the power control parameters transmitted by the base station; and a second determining module, adapted to determine an uplink transmitting power on a sub-carrier included in corresponding frequency partition according to the power control parameters received by the receiving module.

In virtue of the technical solution provided by the present invention, by transmitting power control parameters of a plurality of frequency partitions of the uplink frequency band to the terminal, the present invention ensures the terminal to determine the transmitting power on the sub-carrier included in the corresponding frequency partition according to the power control parameters, and can solve the problems that the method for controlling the uplink transmitting power in related technology is not flexible and can not effectively improve the uplink performance of the system, so as to achieve the aims of controlling the uplink interference between the cells effectively and improving the uplink performance of the system.

Other characteristics and advantages of the present invention will be described in the following specification, and will be apparent partly from the specification, or can be understood by implementing the present invention. The objects and other advantages can be realized and obtained by the structures specified in the specification, claims, and the drawings.

BRIEF DESCRIPTION OF THE ACCOMPANYING DRAWINGS

The drawings herein are used to provide further understanding to the present invention and form a part of the application. The exemplary embodiments of the present invention and the explanation thereof are used to explain the present invention rather than unduly limit the present invention. In the accompanying drawings.

DETAILED DESCRIPTION OF THE EMBODIMENTS

Function Summary

With consideration to the problems in related technology that the methods for controlling the uplink transmitting power is not flexible, and can not effectively improve the uplink performance of the system, a mechanism for controlling the uplink transmitting power is provided by embodiments of the present invention. In the technical schemes provided by the embodiments of the present invention, by transmitting power control parameters (e.g. a compensation factor, a noise rise target, a target ratio of signal to interference and noise, a target ratio of signal to noise) of a plurality of frequency partitions of an uplink frequency band to the terminal, the present invention ensures the terminal to determine a transmitting power on a sub-carrier included in a corresponding frequency partition according to the power control parameters, so as to transmit data or signals to a base station with proper uplink transmitting power and control uplink interference between cells, and improve uplink performance of the system.

The embodiments of the present invention will be described hereinafter in connection with the accompanying drawings. What needs to be explained is that if un-conflictive, the embodiments of the present invention and technical features thereof can be combined with each other, all of which are concluded in the protection scope of the present invention. In addition, in order to describe the embodiments conveniently, some step numbers are used in the description hereafter, which are not used to restrict the present invention. Besides, each step described in the following method embodiments can be executed in an instruction-executable computer system formed by a group of computers. Furthermore, although the flowcharts give the logic sequence, the steps given or described by the embodiments can be executed in different sequences under certain circumstances.

Method Embodiments

A method for controlling an uplink transmitting power is provided according to an embodiment of the present invention.

Figure 1:
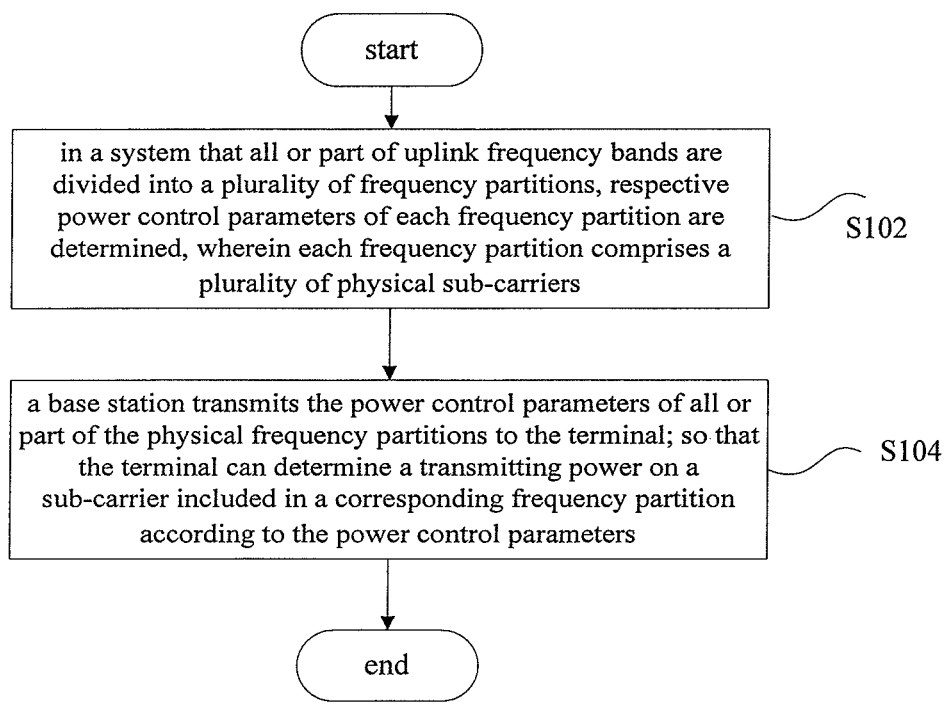
FIG. 1 is a flowchart of a method for controlling an uplink transmitting power according to a method embodiment of the present invention.

FIG. 1 is a flowchart of the method for controlling the uplink transmitting power according to the method embodiment of the present invention. As shown in FIG. 1, the method for controlling the uplink transmitting power according to the method embodiment of the present invention comprises steps S102-S104.

Step S102, in a system that all or part of uplink frequency bands are divided into a plurality of frequency partitions, respective power control parameters of each frequency partition are determined, wherein each frequency partition comprises a plurality of physical sub-carriers.

Step S104, a base station transmits the power control parameters of all or part of the frequency partitions to a terminal, so that the terminal can determine a transmitting power on a sub-carrier included in a corresponding frequency partition according to the power control parameters, wherein the power control parameters comprise but is not limited to: a compensation factor and a noise rise target. Each kind of power control parameter will be described in detail hereinafter.

By the technical scheme provided by the embodiment, the power control parameters of a plurality of frequency partitions of the uplink frequency bands are transmitted to the terminal, which can ensure the terminal to determine the transmitting power on the sub-carrier included in the corresponding frequency partition according to the power control parameters, so as to improve uplink interference between cells effectively.

The above-mentioned process will be described in detail hereinafter.

(I) Step S102

Figure 2:
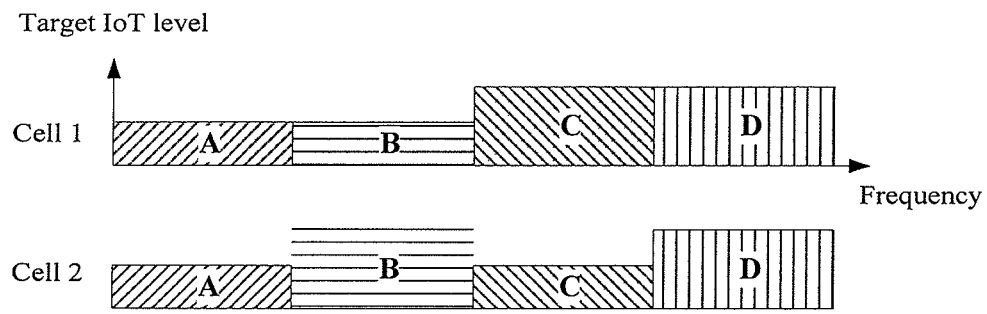
FIG. 2 is a schematic diagram of a plurality of frequency partitions of an uplink frequency band of a method for controlling an uplink transmitting power according to a method embodiment of the present invention.

FIG. 2 is a schematic diagram of a plurality of frequency partitions of an uplink frequency band of the method for controlling the uplink transmitting power according to a method embodiment of the present invention. As shown in FIG. 2, the available uplink frequency resources in each cell are divided into four frequency partitions, and each frequency partition has respective uplink target IoT value. In the cell 1, the frequency partitions A and B have lower uplink target IoT value, and the frequency partitions C and D have higher uplink target IoT value. That is to say, for the cell 1, the frequency partitions A and B can only accept smaller uplink interference, while the frequency partitions C and D can accept higher uplink interference. In the cell 2, the frequency partitions A and C have lower uplink target IoT value, and the frequency partitions B and D have higher uplink target IoT value. That is to say, for the cell 2, the frequency partitions A and C can accept smaller uplink interference, while the frequency partitions B and D can accept higher uplink interference.

For a plurality of divided frequency partitions of the uplink frequency bands, the base station determines the power control parameters of each frequency partition respectively, wherein the power control parameters provide reference for the terminal to determine the uplink transmitting power according to the states of different frequency sections of an uplink channel of the present cell.

Preferably, the base station can also determine the power control parameters of each frequency partition of the present cell according to an IoT in each frequency partition of adjacent cells. In this way, the power control parameters provides further reference for the terminal to determine the uplink transmitting power, so as to provide more effective and flexible reference for improving the interference between the cells. As mentioned above, the power control parameters described in the embodiments of the present invention can be at least the compensation factor or the noise rise target. Based on the above, the embodiment provides two schemes for the base station to determine the power control parameters of each frequency partition of the present cell according to the IoT in each frequency partition of the adjacent cells. Namely, scheme I, the base station determines the compensation factor of each frequency partition of the present cell according to the IoT in each frequency partition of the adjacent cells; scheme II, the base station determines the noise rise target of each frequency partition of the present cell according to the IoT in each frequency partition of the adjacent cells. The two schemes will be described in detail hereinafter.

Scheme I, the base station determines the compensation factor of each frequency partition of the present cell according to the IoT in each frequency partition of the adjacent cells.

Preferably, the base station can figure out the compensation factor according to any one of the following formulas.

$$\alpha = \min(IoT_n)/\max(IoT_n) \quad \text{Formula 1}$$

wherein $\alpha$ is the compensation factor, and $\alpha$ is a real number more than or equal to 0 and less than or equal to 1, $IoT_n$ is a set of values of the expected IoT of the adjacent cells in the frequency partition.

$$\alpha = N * \min(IoT_n) \Big/ \sum_{i=1}^{N} IoT_{n_i}, \quad \text{Formula 2,}$$

wherein, $\alpha$ is the compensation factor, and $\alpha$ is a real number more than or equal to 0 and less than or equal to 1, $IoT_n$ is a set of values of the expected IoT of the adjacent cells in the frequency partition, $IoT_{n_i}$ is a value of the expected IoT of the i-th adjacent cell in the frequency partition, N is a number of adjacent cells and is a natural number more than or equal to 1.

$$\alpha = \left(\sum_{i=1}^{N} IoT_{n_i}\right) \Big/ (N * \max(IoT_n)), \quad \text{Formula 3,}$$

wherein, $\alpha$ is the compensation factor, and $\alpha$ is a real number more than or equal to 0 and less than or equal to 1, $IoT_n$ is a set of values of the expected IoT of the adjacent cells in the frequency partition, $IoT_{n_i}$ is a value of the expected IoT of the i-th adjacent cell in the frequency partition, N is a number of adjacent cells and is a natural number more than or equal to 1.

Formula 4, $$\alpha = \left(N \Big/ \sum_{i=1}^{N} (1/IoT_{n_i})\right) \Big/ \max(IoT_n), \quad \text{Formula 4,}$$

wherein, $\alpha$ is the compensation factor, and $\alpha$ is a real number more than or equal to 0 and less than or equal to 1, $IoT_n$ is a set of values of the expected IoT of the adjacent cells in the frequency partition, $IoT_{n_i}$ is a value of expected IoT of the i-th adjacent cell in the frequency partition, N is a number of adjacent cells and is a natural number more than or equal to 1.

What needs to be explained is that the formulas 1-4 are only exemplary. For those common skilled in the art, the other modification modes are easy to be deduced on the basis of the above-mentioned formulas to figure out the compensation factor. However, what should be understood is that any modifications and amendments on the basis of the above-mentioned formulas are all included in the protection scope of the present invention.

Scheme II, the base station determines the noise rise target of each frequency partition of the present cell according to the IoT in each frequency partition of the adjacent cells.

In the scheme II, preferably, the base station can figure out the noise rise target according to any one of the following formulas.

$$NRT = \min(IoT_n), \quad \text{Formula 10}$$

wherein, NRT is the noise rise target, $IoT_n$ is a set of values of the expected IoT of the adjacent cells in the frequency partition.

$$NRT = \left(\sum_{i=1}^{N} IoT_{n_i}\right) / N, \qquad \text{Formula 11,}$$

wherein, NRT is the noise rise target, $IoT_n$ is a set of values of the expected IoT of the adjacent cells in the frequency partition, N is a number of adjacent cells and is a natural number more than or equal to 1.

$$NRT = N \bigg/ \sum_{i=1}^{N} (1/IoT_{n_i}), \qquad \text{Formula 12,}$$

wherein, NRT is the noise rise target, $IoT_{n_i}$ is a value of expected IoT of the i-th adjacent cell in the frequency partition, N is a number of adjacent cells and is a natural number more than or equal to 1.

What needs to be explained is that the formulas 10-12 are only exemplary. For those common skilled in the art, the other modification modes are easy to be deduced on the basis of the above-mentioned formulas to figure out the noise rise target. However, what should be understood is that any modifications and amendments on the basis of the above-mentioned formulas are all included in the protection scope of the present invention.

The base station determines the power control parameters (e.g. the compensation factor or the noise rise target) of each frequency partition of the present cell according to the states of different frequency sections of the uplink channel of the adjacent cells, so as to provide reference for the terminal to determine the uplink transmitting power according to the states of different frequency sections of the uplink channel of the adjacent cells, and provide more effective and flexible reference for improving the interference between the cells.

(II) Step S104

After determining the power control parameters, the base station can transmit the power control parameters corresponding to the whole or part of the frequency partitions to the terminal in the modes of broadcast, multicast or unicast.

Preferably, when a plurality of frequency partitions have a same compensation factor, the base station transmits only the same compensation factor, and can identify the plurality of frequency partitions which have the same compensation factor by giving a frequency partition identifier or a mode of bit mapping.

After the base station transmits the power control parameters, the terminal can determine the uplink transmitting power on a sub-carrier included in the corresponding frequency partition according to the power control parameters received.

Preferably, under the circumstance that the terminal does not receive or fails to analyze the compensation factor transmitted by the base station, the default value of the compensation factor will be 1. In the nature of things, the default value can also be set as required or set as the other values. The present invention does not have any limitation to this.

As mentioned above, the power control parameters described in the embodiments of the present invention can be at least the compensation factor or the noise rise target. Based on the above, aiming at the above-mentioned scheme I and scheme II, the embodiment provides two schemes for the base station to determine the uplink transmitting power on the sub-carrier included in the corresponding frequency partition according to the power control parameters received. Namely, aiming at the scheme I, the terminal determines the uplink transmitting power on the sub-carrier included in the corresponding frequency partition according to the compensation factor received; aiming at the scheme II, the terminal determines the uplink transmitting power on the sub-carrier included in the corresponding frequency partition according to the noise rise target received. The two schemes will be described in detail hereinafter.

Aiming at the scheme I, the terminal determines the uplink transmitting power on the sub-carrier included in the corresponding frequency partition according to the compensation factor received.

Preferably, the terminal can figure out the uplink transmitting power on the sub-carrier included in the corresponding frequency partition according to any one of the following formulas.

$$P_{SC} = \min\{P_{max}, P_{ref} + \alpha \cdot PL + \Delta_{TF}(i) + f(j)\}, \qquad \text{Formula 5}$$

wherein, $P_{SC}$ is the transmitting power of the terminal on the sub-carrier, $P_{ref}$ is a minimum receiving power required for the base station to guarantee basic quality of a receiving signal, $\alpha$ is the compensation factor, PL, is a link loss compensation value determined by the terminal according to receiving quality of a downlink channel, $\Delta_{TF}(i)$ is an adjustment parameter related to modulation code grade allocated to the terminal by the base station, i is a grade of transmitting format, the selection of the value of the i is related to the $P_{ref}$, f(g) is a power adjustment command sent to the terminal by the base station, and the value of the f(j)f(g) is more than or equal to 0, j is an identifier of the terminal, preferably, f(j)f(g) is optional, $P_{max}$ is a maximum transmitting power of the terminal on the sub-carrier included in the frequency partition.

$$P_{SC} = \min\{P_{max}, SINR_{TARGET} + \alpha \cdot PL + N + IoT\}, \qquad \text{Formula 6}$$

wherein, $P_{SC}$ is the transmitting power of the terminal on the sub-carrier, $SINR_{TARGET}$ is a target ratio of signal to noise required for the base station to receive uplink data normally, $\alpha$ is the compensation factor, PL is a link loss compensation value determined by the terminal according to receiving quality of a downlink channel, N is a thermal noise, IoT is a value of an interference over thermal noise ratio of the base station, N and IoT are notified to the terminal by the base station through a downlink channel, $P_{max}$ is a maximum transmitting power of the terminal on the sub-carrier included in the frequency partition.

$$P_{SC} = P_{max} \cdot \min\{1, \max[R_{min}, (PL/PL_{x\text{-}tile})^{\alpha}]\}, \qquad \text{Formula 7}$$

wherein, $P_{SC}$ is the transmitting power of the terminal on the sub-carrier, $R_{min}$ is a minimum transmitting power measurement factor of the terminal, $\alpha$ is the compensation factor, PL, is a link loss compensation value determined by the terminal according to receiving quality of a downlink channel, $PL_{x\text{-}tile}$ is a statistical value determined according to link loss condition of the terminal, the value of the $PL_{x\text{-}tile}$ is notified to the terminal by the base station through a downlink channel, $P_{max}$ is a maximum transmitting power of the terminal on the sub-carrier included in the frequency partition.

$$P_{SC} = \min\{P_{max}, SINR_{TARGET} + \alpha \cdot PL + N + IoT + \Delta_{power\_adjust} + O_{power\_scaling} + \text{Offset}_{ICI}\}, \qquad \text{Formula 8}$$

wherein, $P_{SC}$ is the transmitting power of the terminal on the sub-carrier, $SINR_{target}$ is a target ratio of signal to noise required for the base station to receive uplink data normally, $\alpha$ is the compensation factor, PL is a link loss compensation value determined by the terminal according to receiving quality of a downlink channel, N is a thermal noise, IoT is a value of an interference over thermal noise ratio of the base station, N and IoT are notified to the terminal by the base station through a downlink channel, $\Delta_{power\_adjust}$ is a power adjustment value sent to the terminal by the base station, $\sigma_{power\_scaling}$ is a power adjustment value in a single user transmitting mode or a multi-user transmitting mode, Off-set$_{ICI}$ is an adjustment value for adjusting interference between the cells sent by the base station, $P_{max}$ is a maximum transmitting power of the terminal on the sub-carrier included in the frequency partition.

$$P_{SC}=\min\{P_{max}, \text{SINR}_{TARGET}+\alpha \cdot PL+N+\text{IoT}+\Delta_{BS}+\Delta_{MS}\}, \quad \text{Formula 9}$$

wherein, $P_{SC}$ is the transmitting power of the terminal on the sub-carrier, is a target ratio of signal to noise required for the base station to receive uplink data normally, $\alpha$ is the compensation factor, PL, is a link loss compensation value SINR$_{TARGET}$ determined by the terminal according to receiving quality of a downlink channel, N is a thermal noise, IoT is a value of an interference over thermal noise ratio of the base station, N and IoT are notified to the terminal by the base station through a downlink channel, $\Delta_{BS}$ is a power adjustment value sent to the terminal by the base station, $\Delta_{MS}$ is a self-adjustment value of the terminal determined according to condition of a wireless channel, $P_{max}$ is a maximum transmitting power of the terminal on the sub-carrier included in the frequency partition.

The terminal uses the transmitting power on the sub-carrier to transmit the uplink data, so as to improve the interference between the cells effectively.

Aiming at the scheme II, the terminal determines the uplink transmitting power on the sub-carrier included in the corresponding frequency partition according to the noise rise target received.

Based on the scheme II, preferably, the terminal can figure out the uplink transmitting power on the sub-carrier according to the following formula.

$$P_{SC}=\min\{P_{max}, NRT+N-g\}, \quad \text{Formula 13}$$

wherein, $P_{SC}$ is the transmitting power of the terminal on the sub-carrier, NRT is a value of the noise rise target, N is a thermal noise, the value of N is notified to the terminal by the base station through a downlink channel, g is an equivalent path gain, and is a difference value between a total receiving power of the terminal and a power received from the base station by the terminal, $P_{max}$ is a maximum transmitting power of the terminal on the sub-carrier included in the frequency partition.

The terminal uses the transmitting power on the sub-carrier to transmit the uplink data, so as to improve the interference between the cells effectively.

Figure 3:
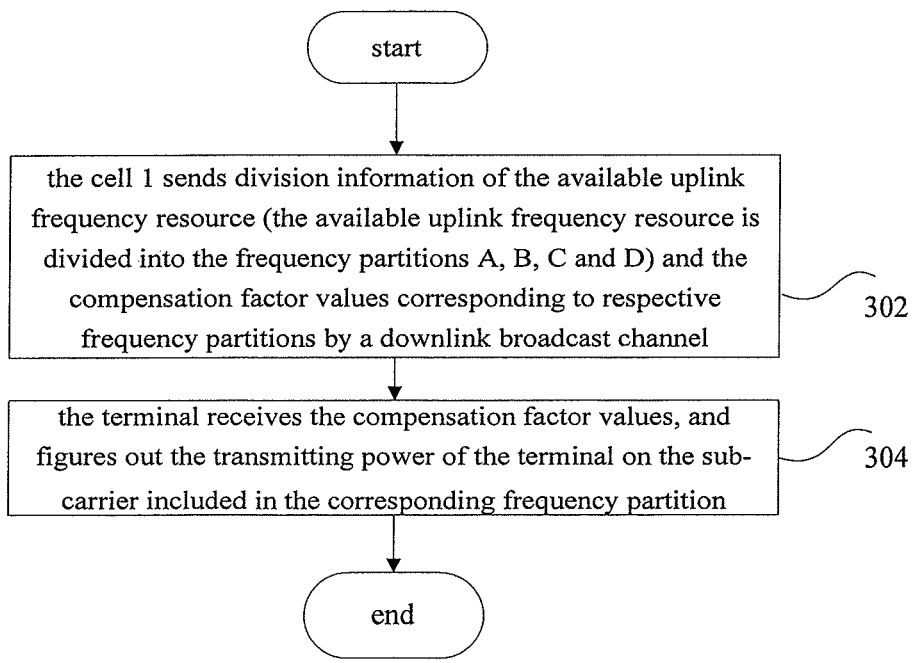
FIG. 3 is a specific implementation flowchart of a method for controlling an uplink transmitting power according to a method embodiment of the present invention.

Based on the above description, FIG. 3 is a specific implementation flowchart of the method for controlling the uplink transmitting power according to the method embodiment of the present invention. As shown in FIG. 3, the flow comprises steps 302-304.

Step 302, the cell 1 sends division information of the available uplink frequency resource (the available uplink frequency resource is divided into the frequency partitions A, B, C and D, the division situation of the available uplink frequency resource is as shown in FIG. 2) and the compensation factor values corresponding to respective frequency partitions by a downlink broadcast channel. The specific process can be realized by the operations of the embodiment shown in FIG. 1, wherein step 302 can be corresponding to the step S102.

Step 304, after receiving the division information, the terminal determines the compensation factors in different frequency partitions, and figures out the transmitting power of the terminal on the sub-carrier included in the corresponding frequency partition according to the formula 9 $P_{SC}=\min\{P_{max}, \text{SINR}_{TARGET}+\alpha \cdot PL+N+\text{IoT}+\Delta_{BS}+\Delta_{MS}\}$, wherein, the variable $P_{SC}$ is the transmitting power of the terminal on the sub-carrier, SINR$_{TARGET}$ is a target ratio of signal to noise required for the base station to receive the uplink data normally, $\alpha$ is the compensation factor corresponding to the frequency partition, PL is a link loss compensation value determined by the terminal according to receiving quality of the downlink channel, N is a thermal noise, IoT is a value of an interference over thermal noise ratio of the base station, the variables N and IoT are notified to the terminal by the cell 1 through a downlink channel, $\Delta_{BS}$ is a power adjustment value sent to the terminal by the cell 1, $\Delta_{MS}$ is a self-adjustment value of the terminal determined according to condition of a wireless channel, $P_{max}$ is a maximum transmitting power of the terminal on the sub-carrier corresponding to the frequency partition. Step 304 can be corresponding to the step S104.

In the step 302, the compensation factors corresponding to respective uplink frequency partitions in the cell 1 are determined with consideration to a target IoT value in respective corresponding frequency partitions in the cell 2. For example, if the cell 2 requires lower target IoT value (namely smaller cell interference) in the uplink frequency partitions A and C, the cell 1 can set the corresponding compensation factors in the frequency partitions A and C lower; if the cell 2 allows higher target IoT value (namely bigger cell interference) in the uplink frequency partitions B and D, the cell 1 can set the corresponding compensation factors in the frequency partitions B and D higher, so as to control the interference between the cells flexibly. On the contrary, the compensation factors corresponding to respective frequency partitions in the cell 2 are determined with consideration to the target IoT values in respective corresponding frequency partitions in the cell 1.

Figure 4:
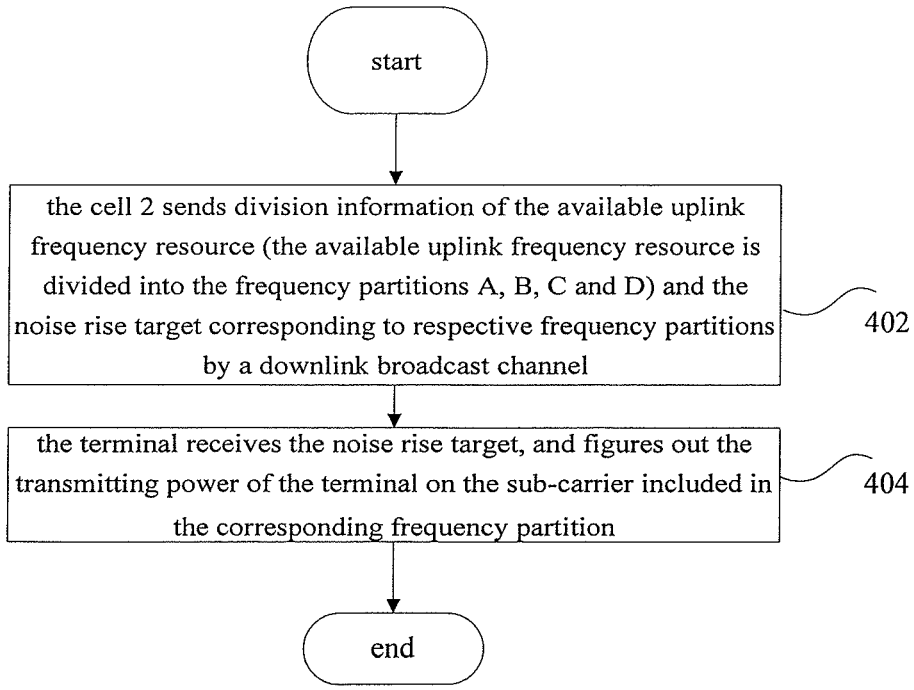
FIG. 4 is another specific implementation flowchart of a method for controlling an uplink transmitting power according to a method embodiment of the present invention.

FIG. 4 is another specific implementation flowchart of the method for controlling the uplink transmitting power according to the method embodiment of the present invention. As shown in FIG. 4, the flow comprises steps 402-404.

Step 402, the cell 2 sends division information of the available uplink frequency resource (the available uplink frequency resource is divided into the frequency partitions A, B, C and D, the division situation of the available uplink frequency resource is as shown in FIG. 2) and the noise rise target values (Target Interference over Thermal, Interference Target, Noise Rise Target) corresponding to respective frequency partitions by a downlink broadcast channel. The specific process can be realized by the operations of the embodiment shown in FIG. 1, wherein step 402 can be corresponding to the step S102.

Step 404, after receiving the division information, the terminal determines the noise rise target value in different frequency partitions, and figures out the transmitting power of the terminal on the sub-carrier included in the corresponding frequency partition according to the formula 13 $P_{SC}=\min\{P_{max}, NRT+N-g\}$, wherein, the variable $P_{SC}$ is the transmitting power of the terminal on the sub-carrier, NRT is a value of the noise rise target, N is a thermal noise, the value of N is notified to the terminal by the cell 2 through a downlink channel, g is an equivalent path gain, and is a difference value between a total receiving power of the terminal and a power received from the base station by the terminal, $P_{max}$ is a maximum transmitting power of the terminal on the sub-carrier corresponding to the frequency partition. Step 404 can be corresponding to the step S104.

In the step 402, the noise rise target value corresponding to respective uplink frequency partitions in the cell 2 are determined with consideration to a target IoT value in respective corresponding frequency partitions in the cell 1. For example, if the cell 1 requires lower target IoT value (namely smaller cell interference) in the uplink frequency partitions A and B, the cell 2 can set the corresponding noise rise target value in the frequency partitions A and B lower; if the cell 1 allows higher target IoT value (namely bigger cell interference) in the uplink frequency partitions C and D, the cell 2 can set the corresponding noise rise target value in the frequency partitions C and D higher, so as to control the interference between the cells flexibly. On the contrary, the noise rise target value corresponding to respective frequency partitions in the cell 1 are determined with consideration to the target IoT value in respective corresponding frequency partitions in the cell 2.

The calculation methods of the uplink transmitting power of the target ratio of signal to interference and noise, and the target ratio of signal to noise on the basis of the whole or part of the frequency partitions follows the calculation methods of the uplink transmitting power on the basis of the noise rise target value, so unnecessary details will not be given herein any more.

Apparatus Embodiment

A base station is provided according to an embodiment of the present invention. Preferably, the base station can be used for realizing the method for controlling the uplink transmitting power provided in the above method embodiments.

Figure 5:
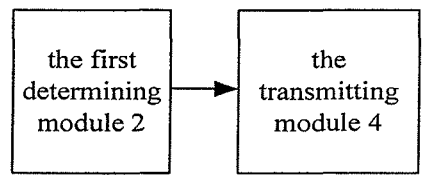
FIG. 5 is a block diagram of a base station according to a device embodiment of the present invention.

FIG. 5 shows a structure of the base station according to a device embodiment of the present invention. As shown in FIG. 5, the base station comprises a first determining module 2 and a transmitting module 4. The functions of the above modules will be described in detail hereinafter.

The first determining module 2 is adapted to determine the power control parameters of each frequency partition. Preferably, the power control parameters can be the compensation factor or the noise rise target. Preferably, the first determining module 2 is further adapted to determine the power control parameters of each corresponding frequency partition according to an excepted IoT of the adjacent cells in each frequency partition.

The transmitting module 4 is connected with the first determining module 2, and is adapted to transmit the power control parameters of all or part of the frequency partitions determined by the first determining module 2 to the terminal.

In practical application, the work flow of the above modules comprises the processes as follows. Under the circumstance that the uplink frequency band is divided into a plurality of frequency partitions, the first determining module 2 firstly determines the power control parameters of respective frequency partitions. Preferably, the first determining module 2 can determine the power control parameters (namely, the compensation factor, or the noise rise target, or the target ratio of signal to interference and noise, or the target ratio of signal to noise) of each frequency partition of the present cell according to the IoT of the adjacent cells in each frequency partition. The detailed determining method can refer to the above formulas 1-12, so unnecessary details will not be given herein any more. Then, the transmitting module 4 transmits the power control parameters determined by the first determining module 2 to the terminal in the modes of broadcast, multicast or unicast.

By setting the first determining module 2 and the transmitting module 4, the base station provided by the embodiment transmits the power control parameters of a plurality of frequency partitions of the uplink frequency band to the terminal. The terminal can determine the transmitting power on the sub-carrier included in the corresponding frequency partition according to the power control parameters, so as to improve the uplink interference between the cells effectively.

System Embodiment

A system for controlling an uplink transmitting power is provided according to an embodiment of the present invention. The system for controlling the uplink transmitting power comprises a base station and a terminal. Preferably, the base station can be used for realizing the method for controlling the uplink transmitting power provided in the above method embodiments.

Figure 6:
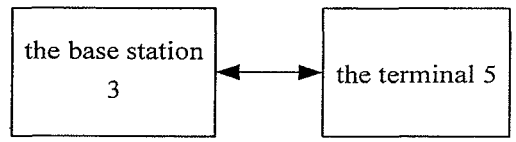
FIG. 6 is a block diagram of a system for controlling an uplink transmitting power according to a system embodiment of the present invention.

FIG. 6 shows the structure of the system for controlling the uplink transmitting power according to the system embodiment of the present invention. As shown in FIG. 6, the system for controlling the uplink transmitting power according to the system embodiment of the present invention comprises the base station 3 and the terminal 5. The functions of the above modules will be described in detail hereinafter.

The base station 3 comprises: a first determining module which is adapted to determine power control parameters of each frequency partition; and a transmitting module which is connected with the first determining module and is adapted to transmit the power control parameters of all or part of frequency partitions determined by the first determining module to the terminal. (The above-mentioned modules are not shown in FIG. 6, and the functions of the above modules are similar to the functions of the modules shown in FIG. 5, so unnecessary details will not be given herein any more.)

The terminal 5 comprises: a receiving module which is adapted to receive the power control parameters transmitted by the base station; and a second determining module which is connected with the receiving module and is adapted to determine an uplink transmitting power on a sub-carrier included in corresponding frequency partition according to the power control parameters received by the receiving module. (The above-mentioned modules are not shown in FIG. 6.)

In practical application, the work flow of the system comprises the processes as follows: the first determining module of the base station 3 firstly determines the power control parameters of each frequency partition. Preferably, the first determining module can determine the power control parameters (namely, the compensation factor, or the noise rise target, or the target radio of signal to interference and noise, or the target ratio of signal to noise) of each frequency partition of the present cell according to the IoT of the adjacent cells in each frequency partition. The specific determining methods can refer to the above formulas 1-4 or the above formulas 10-12, so unnecessary details will not be given herein any more. Then, the transmitting module transmits the power control parameters determined by the first determining module to the terminal 5 in the modes of broadcast, multicast or unicast. After the terminal 5 receives the power control parameters transmitted by the base station 3 through the receiving module, the second determining module determines the uplink transmitting power on the sub-carrier included in the corresponding frequency partition according to the power control parameters. The specific determining method can refer to the formulas 5-9 or the formula 13, so unnecessary details will not be given herein any more.

All in all, in virtue of the technical scheme provided by the present invention, by transmitting the power control parameters of a plurality of frequency partitions of the uplink frequency band to the terminal, and considering the power control parameters, the present invention ensures the terminal to determine the transmitting power according to the states of different frequency sections of the uplink channel, so as to transmit data or signals to the base station with comparatively proper uplink power, and further control the uplink interference between the cells effectively, and improve the uplink performance of the system.

The descriptions above are only preferable embodiments of the present invention, which are not used to restrict the present invention. For those skilled in the art, the present invention may have various changes and variations. Any amendments, equivalent substitutions, improvements etc. within the spirit and principle of the present invention are all concluded in the scope of protection of the present invention.

The invention claimed is:

1. A method for controlling an uplink transmitting power in a system in which an uplink frequency band is divided into a plurality of frequency partitions, the method comprising:
a base station determining respective power control parameters of each frequency partition, wherein each frequency partition comprises a plurality of physical sub-carriers;
and the base station transmitting the power control parameters of all or part of the frequency partitions to a terminal, so that the terminal determines a transmitting power ($P_{SC}$) on a sub-carrier included in a corresponding frequency partition according to the power control parameters; wherein
the power control parameters comprise a compensation factor ($\alpha$), and before transmitting the power control parameters to the terminal, the method further comprises: for each frequency partition, determining the compensation factor of the corresponding frequency partition of a present cell according to an expected uplink Interference over Thermal Noise Ration (IoT) of adjacent cells in the frequency partition; or
the power control parameters comprise a noise rise target (NRT), and before transmitting the power control parameters to the terminal, the method further comprises: for each frequency partition, determining the noise rise target of the corresponding frequency partition of a present cell according to an expected IoT of adjacent cells in the frequency partition.

2. The method according to claim 1, wherein the determining the compensation factor ($\alpha$) includes using one of the following formulas:

$$\alpha = \min(IoT_n)/\max(IoT_n),$$

wherein, $\alpha$ is a real number more than or equal to 0 and less than or equal to 1, $IoT_n$ is a set of values of the expected IoT of the adjacent cells in the frequency partition;

$$\alpha = N*\min(IoT_n) \Big/ \sum_{i=1}^{N} IoT_{n_i},$$

wherein, $\alpha$ is a real number more than or equal to 0 and less than or equal to 1, $IoT_n$ is a set of values of the expected IoT of the adjacent cells in the frequency partition, $IoT_{n_i}$ is a value of the expected IoT of the i-th adjacent cell in the frequency partition, N is a number of adjacent cells and is a natural number more than or equal to 1;

$$\alpha = \left(\sum_{i=1}^{N} IoT_{n_i}\right) \Big/ (N*\max(IoT_n)),$$

wherein, $\alpha$ is a real number more than or equal to 0 and less than or equal to 1, $IoT_n$ is a set of values of the expected IoT of the adjacent cells in the frequency partition, $IoT_{n_i}$ is a value of expected IoT of the i-th adjacent cell in the frequency partition, N is a number of adjacent cells and is a natural number more than or equal to 1; or $$\alpha = \left(N \Big/ \sum_{i=1}^{N} (1/IoT_{n_i})\right) \Big/ \max(IoT_n),$$

wherein, $\alpha$ is a real number more than or equal to 0 and less than or equal to 1, $IoT_n$ is a set of values of the expected IoT of the adjacent cells in the frequency partition, $IoT_{n_i}$ is a value of expected IoT of the i-th adjacent cell in the frequency partition, N is a number of adjacent cells and is a natural number more than or equal to 1.

3. The method according to claim 1, wherein the method further comprises:
the terminal determining the transmitting power ($P_{SC}$) on the sub-carrier by one of the following formulas:

$$P_{SC}=\min\{P_{max}, P_{ref}+\alpha \cdot PL+\Delta_{TF}(i)+f(j)\},$$

wherein, $P_{ref}$ is a minimum receiving power required for the base station to guarantee basic quality of a receiving signal, $\alpha$ is the compensation factor, PL is a link loss compensation value determined by the terminal according to receiving quality of a downlink channel, $\Delta_{TF}(i)$ is an adjustment parameter related to modulation code grade allocated to the terminal by the base station, wherein i is a grade of transmission format, f(i) is a power adjustment command sent to the terminal by the base station, and a value of the f(i) is more than or equal to 0, j is an identifier of the terminal, $P_{max}$ is a maximum transmitting power of the terminal on a sub-carrier included in the frequency partition;

$$P_{SC}=\min\{P_{max}, SINR_{TARGET}+\alpha \cdot PL+N+IoT\},$$

wherein, $SINR_{TARGET}$ is a target ratio of signal to noise required for the base station to receive uplink data normally, $\alpha$ is the compensation factor, PL is a link loss compensation value determined by the terminal according to receiving quality of a downlink channel, N is a thermal noise, IoT is a value of an interference over thermal noise ratio of the base station, $P_{max}$ is a maximum transmitting power of the terminal on a sub-carrier included in the frequency partition;

$$P_{SC}=P_{max}*\min\{1, \max[R_{min}, (PL/PL_{x\text{-}tile})^\alpha]\},$$

wherein, $R_{min}$ is a minimum transmitting power measurement factor of the terminal, $\alpha$ is the compensation factor, PL is a link loss compensation value determined by the terminal according to receiving quality of a downlink channel, $PL_{x\text{-}tile}$ is a statistical value determined according to link loss condition of the terminal, $P_{max}$ is a maximum transmitting power of the terminal on a sub-carrier included in the frequency partition;

$$P_{SC}=\min\{P_{max}, SINR_{TARGET}+\alpha \cdot PL+N+IoT+\Delta_{power\_adjust}+\sigma_{power\_scaling}+\text{Offset}_{ICI}\},$$

wherein, $SNR_{TARGET}$ is a target ratio of signal to noise required for the base station to receive uplink data normally, $\alpha$ is the compensation factor, PL is a link loss compensation value determined by the terminal according to receiving quality of a downlink channel, N is a thermal noise, IoT is a value of an interference over thermal noise ratio of the base station, $\Delta_{power\_adjust}$ is a power adjustment value sent to the terminal by the base station, $\sigma_{power\_scaling}$ is a power adjustment value in a single user transmitting mode or a multi-user transmitting mode, $Offset_{ICI}$ is an adjustment value for adjusting interference between cells sent by the base station, $P_{max}$ is a maximum transmitting power of the terminal on a sub-carrier included in the frequency partition; or $$P_{SC}=\min\{P_{max},SINR_{TARGET}+\cdot PL+N+IoT+\Delta_{BS}+\Delta_{MS}\},$$

where, $SINR_{TARGET}$ is a target ratio of signal to noise required for the base station to receive uplink data normally, α is the compensation factor, PL is a link loss compensation value determined by the terminal according to receiving quality of a downlink channel, N is a thermal noise, IoT is a value of an interference over thermal noise ratio of the base station, $\Delta_{BS}$ is a power adjustment value sent to the terminal by the base station, $\Delta_{MS}$ is a self-adjustment value of the terminal determined according to condition of a wireless channel, $P_{max}$ is a maximum transmitting power of the terminal on a sub-carrier included in the frequency partition.

4. The method according to claim 3, wherein the method further comprises:
the terminal receiving and analyzing the compensation factor, and determining the transmitting power on the sub-carrier included in the corresponding frequency partition according to the compensation factor, wherein if the terminal fails to receive or analyze the compensation factor, the default value of the compensation factor is 1.

5. The method according to claim 1, wherein the method further comprises:
the terminal receiving and analyzing the compensation factor, and determining the transmitting power on the sub-carrier included in the corresponding frequency partition according to the compensation factor, wherein if the terminal fails to receive or analyze the compensation factor, the default value of the compensation factor is 1.

6. The method according to claim 1, wherein the noise rising target (NRT) is determined by one of the following formulas:

$$NRT=\min(IoT_n),$$

wherein, $IoT_n$ is a set of values of the expected IoT of the adjacent cells in the frequency partition;

$$NRT = \left(\sum_{i=1}^{N} IoT_{n_i}\right)/N,$$

wherein, $IoT_n$ is a set of values of the expected IoT of the adjacent cells in the frequency partition, N is a number of adjacent cells and is a natural number more than or equal to 1; or $$NRT = N \bigg/ \sum_{i=1}^{N} (1/IoT_{n_i}),$$

wherein, $IoT_{n_i}$ is a value of expected IoT of the i-th adjacent cell in the frequency partition, N is a number of adjacent cells and is a natural number more than or equal to 1.

7. The method according to claim 1, wherein the method further comprises:
the terminal determining the transmitting power ($P_{SC}$) on the sub-carrier by the following formula:

$$P_{SC}=\min\{P_{max},NRT+N-g\},$$

wherein, NRT is a value of the noise rise target, N is a thermal noise, g is an equivalent path gain, and is a difference value between a total receiving power of the terminal and a power received from the base station by the terminal, $P_{max}$ is a maximum transmitting power of the terminal on a sub-carrier included in the frequency partition.

8. The method according to claim 1, wherein the base station transmitting the power control parameters includes transmitting in one of the modes of broadcast, multicast or unicast.

9. A base station in a system in which an uplink frequency band is divided into a plurality of frequency partitions, the base station comprising:
a first determining module, adapted to determine power control parameters of each frequency partition; and
a transmitting module, adapted to transmit the power control parameters of all or part of the frequency partitions determined by the first determining module to a terminal; wherein
the power control parameters comprise a compensation factor, and before transmitting the power control parameters to the terminal, for each frequency partition, the compensation factor of a corresponding frequency partition of a present cell is determined according to an expected uplink Interference over Thermal Noise Ration (IoT) of adjacent cells in the frequency partition; or
the power control parameters comprise a noise rise target, and before transmitting the power control parameters to the terminal, for each frequency partition, the noise rise target of the corresponding frequency partition of a present cell is determined according to an expected IoT of adjacent cells in the frequency partition.

10. The base station according to claim 9, wherein the first determining module is further adapted to determine the power control parameters of each corresponding frequency partition according to an excepted IoT of adjacent cells in each frequency partition.

11. A system for controlling an uplink transmitting power in which an uplink frequency band is divided into a plurality of frequency partitions, the system comprising a base station and a terminal, wherein
the base station comprises:
a first determining module, adapted to determine power control parameters of each frequency partition;
a transmitting module, adapted to transmit the power control parameters of all or part of frequency partitions determined by the first determining module to the terminal;
the terminal comprises:
a receiving module, adapted to receive the power control parameters transmitted by the base station; and
a second determining module, adapted to determine an uplink transmitting power on a sub-carrier included in a corresponding frequency partition according to the power control parameters received by the receiving module; wherein
the power control parameters comprise a compensation factor, and before transmitting the power control parameters to the terminal, for each frequency partition, the compensation factor of the corresponding frequency partition of a present cell is determined according to an expected uplink Interference over Thermal Noise Ration (IoT) of adjacent cells in the frequency partition; or the power control parameters comprise a noise rise target, and before transmitting the power control parameters to the terminal, for each frequency partition, the noise rise target of the corresponding frequency partition of a present cell is determined according to an expected IoT of adjacent cells in the frequency partition.

* * * * *